DUAL PATH REMOTE CONTROL SYSTEM

Filed Oct. 23, 1959 2 Sheets-Sheet 1

INVENTORS
HENRY P. KALMUS
MAX L. LIBMAN
BY Max L. Libman
ATTORNEY

INVENTORS
HENRY P. KALMUS
MAX L. LIBMAN
BY Max L. Libman
ATTORNEY 3,042,868
DUAL PATH REMOTE CONTROL SYSTEM

Henry P. Kalmus, 3000 University Terrace NW., Washington, D.C., and Max L. Libman, "Tree Haven," Rte. 5, Fairfax County, Va.

Filed Oct. 23, 1959, Ser. No. 848,327
12 Claims. (Cl. 325—64)

This invention relates to remote control systems and apparatus, and more particularly to a wireless remote control apparatus for television equipment and the like.

Remote control systems for televisions have become increasingly popular; such systems permit the viewer to remain seated at some distance from the television set, yet control the station selection, volume of sound, and even the turning on and off of the set by pressing buttons on a portable unit or control box which can be brought to any convenient location in the room. This is very easy to do with a wire connection running from the control box to the television set, but such wired control units are usually considered objectionable because of the necessity of trailing the wire across the room from the set to the viewer's seat. Therefore, various other proposals have been advanced for this purpose, including the use of a small local radio transmitter in the control box, sonic and ultra-sonic devices, and also, by the use of an induction field as the control transmission medium.

Radio control devices are subject to extraneous radiation fields and also tend to interfere with radio reception in the locality, and are usually forbidden by F.C.C. regulation. Supersonic devices are relatively inefficient, and require special and expensive transducers and electronic amplifying equipment. Sonic devices are subject to being set off by random signals produced by any extraneous noise or sound in the room, including the loud speaker of the television itself. Inductive remote control devices tend to be adversely affected by the high electromagnetic and electrostatic fields generated within the television set and it was a major purpose of the proposals previously referred to, to provide means to overcome this difficulty. However, both induction and radio control devices have a further difficulty, namely, that the walls of an ordinary building or apartment house are substantially transparent to these fields; it is therefore possible, and will frequently occur, that a person in the neighboring apartment, operating his own television set, will be sitting closer to the set in an adjacent apartment, either laterally or vertically, than the operator of the set in the adjacent apartment, and therefore it is inevitable that his control device would operate his neighbor's set in an unwanted and disagreeable manner.

It is a major object of the present invention to overcome the above difficulties by the provision of dual-path control, utilizing both mechanical vibrations in the air and an inductive field, which requires the coincidence of both types of signals for its operation. Since the walls of any ordinary room are substantially opaque to the acoustic signal, freedom from outside interference is assured; at the same time, the requirement for an electromagnetic field signal prevents the control apparatus from being triggered by any random sound originating within the room. If an acoustic field alone is used, it is difficult to produce many different control functions because in this case, acoustic generators of many different frequencies are required.

Another object of the invention is to provide a simple and effective circuitry and mechanism for producing a dual signal of the type above described, and simple and inexpensive mechanism and circuitry for receiving and responding to such signals.

A further object of the invention is to provide an inductive-field responsive control device for a television set or other apparatus to be controlled, which is not affected by the fields produced by the set itself. This is accomplished, according to the invention, by the simple expedient of locating the field responsive apparatus for the control unit in the A.-C. power plug which supplies the set with power from the usual wall outlet. This takes advantage of the fact that the inductive field falls off in intensity with the cube of the distance from the source, and in practice it has been found that if the pickup unit is located more than approximately 18 inches from the set, the interference becomes negligible. By locating the actual pickup unit in the power plug, which is almost universally connected to a baseboard outlet, it is assured that the required distance will be maintained under all ordinary conditions.

The specific nature of the invention, as well as other objects and advantages thereof, will clearly appear from a description of a preferred embodiment as shown in the accompanying drawings, in which:

FIG. 1 is a plan view of the control box containing the transmitting unit, with the top cover removed;

FIG. 2 is a side elevation of the control box with the cover on;

Figures 1, 2:
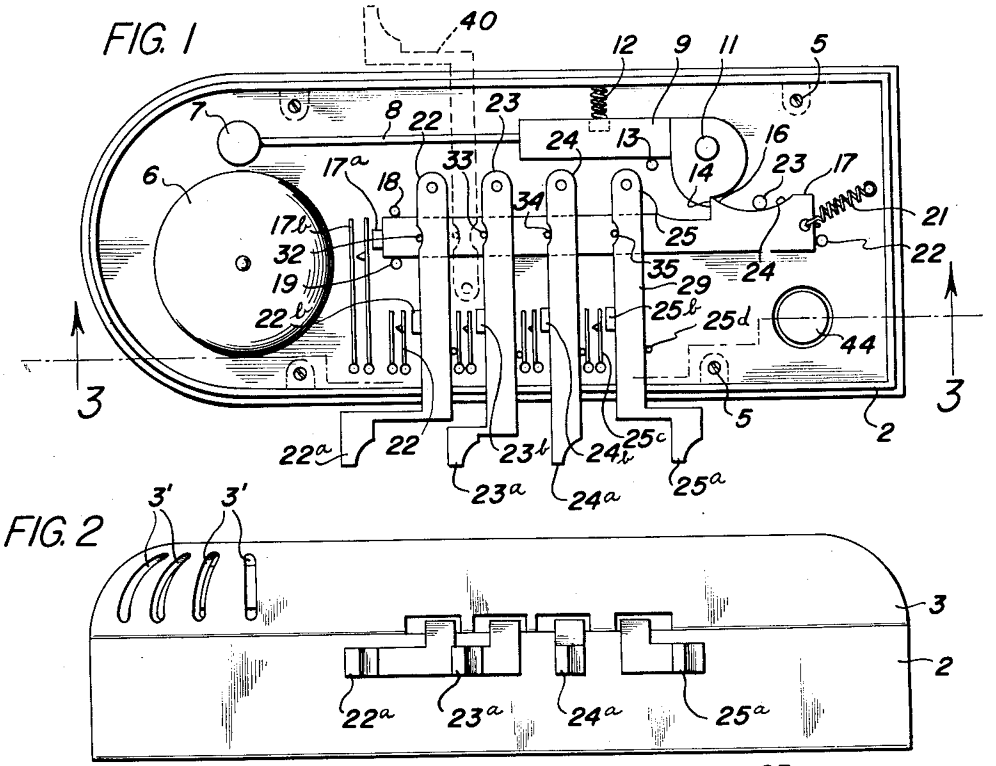
Figure 3:
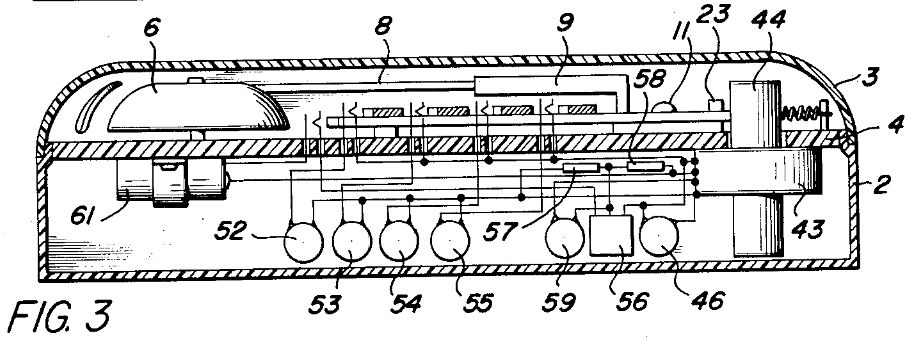
FIG. 3 is a sectional view of the control unit taken on line 3—3 of FIG. 1, with the electrical components schematically indicated.

As shown in FIGS. 1–3, the control unit may be suitably housed in a small, readily portable box or casing 2, preferably made of plastic or similar material, which can also be made of metal if desired, providing that the metal is sufficiently perforated or slotted to permit transmission of both the acoustic and the magnetic fields. A cover 3, preferably of the same material, is provided as shown. The electrical and mechanical components of the unit are preferably mounted on an insulating panel 4 removably mounted by any suitable means such as screws 5 in the casing 2. In general, the mechanical components of the device are mounted on the upper side of the panel 4, while the electrical components are mounted on the lower side.

Mounted at the front end of the panel 4 is a tuned bell or gong 6, which, when struck by the clapper 7, will emit a substanially pure single frequency tone. Clapper 7 is mounted on a resilient wire 8 supported by striker arm 9 which is pivoted at 11 and is biased toward the bell 6 by a spring 12, and restrained by a stop pin 13. Arm 9 is provided with a cammed pawl surface 14 which is engaged by a reciprocating ratchet member 16 which is part of axially slidable strip 17. Strip 17 is restrained between guide pins 18 and 19 for axial movement against the force of spring 21, which biases the right hand end of the strip 17 against stop pin 22 and cam pin 23. Cam pin 23 bears against cam surface 24 of strip 17, so that if the strip is moved to the left in FIG. 1, as the ratchet 16 biases the striker arm 9 clockwise against the action of spring 12, the ratchet is at the same time moved away from the engaged pawl 14 as cam surface 24 rides downwardly on pin 23. This action continues for only a short distance before the ratchet and pawl are disengaged, whereupon the gong is struck once only by the clapper 17, which continues to move past the position shown in FIG. 1 due to its inertia until it strikes the bell 6.

The means for moving strip 17 axially comprise a series of levers, 26, 27, 28, and 29, respectively pivoted near their upper ends to the panel 4 as shown. These levers respectively bear against upright pins 32, 33, 34 and 35, all fixed to strip 17. The levers extend out through the housing to terminate in respective pushbuttons 22a–25a respectively.

At the left hand of strip 17 is mounted an insulating button 17a positioned against switch 17b for closing the contact thereof when the strip is moved to the left. Similarly, each of the levers 22–25 has an insulating button 22b–25b for operating respective switches 22c–25c when the pushbuttons 22a–25a are respectively operated. Lever 25 is provided with a stop pin 25d for restraining its counter-clockwise rotation, and each of the other levers is similarly restrained.

It will be apparent from the above description that when pushbutton 22a is operated by pressing it to the left with the finger, it will cause switches 17b and 22c to close, and at the same time will cause the clapper to strike the bell. The parts are so proportioned that the switches close immediately before the bell is struck, and remain closed for a very short period thereafter, even if the switch is immediately released. If button 23a is pressed, then switches 17b and 23b will be closed as the gong is rung. Thus when any of the pushbuttons is operated, its individual switch together with the main switch 17b will be closed as the gong is being rung. When the pushbutton is released, the parts will be restored to the position shown in FIG. 1, by the action of spring 21. Although only four pushbuttons have been shown, it will be apparent that any desired number can be accommodated by changing the dimensions. Also, if it is desired to have more pushbuttons, levers can be run out to the other side of the control box as shown in phantom at 40.

FIG. 2 shows the device with the cover in place. It will be noted that the end of the cover near the gong is provided with perforations 31 for the passage of sound. If a metal housing or cover is used, it is preferable to have the entire housing of a perforated or slotted type to permit efficient transmission of the magnetic field. If a plastic housing is used, it is preferable to have it electrostatically shielded, as by a thin conductive coating or conductive screen, which prevents detuning by the hand of the user.

FIG. 3 shows the transmitting circuit housed in the control box 2. It will be apparent that when main switch 17b is closed, it closes the battery supply to oscillator circuit 42, which is a conventional transistorized Hartley oscillator in which the coil 43 of the tank circuit is provided with a ferrite core 44, which permits the use of a very compact physical structure having an overall core length, in a practical case, of less than two inches, so that it can be readily enclosed within a reasonably small housing 2.

In parallel with the condenser 46 of the tank circuit, a series of smaller condensers 52, 53, etc., are provided which are selectively added to the circuit by the operation of switches 22a, 23a, etc., these being the same switches previously shown in FIGS. 1 and 3. The values of the respective condensers are selected so that the frequency can be adjusted by discrete predetermined increments; for example, operation of switch 22a may produce a frequency of 40.0 kilocycles; operation of switch 23a will produce 40.1, etc., through 40.2, 40.3, etc. Thus operation of each pushbutton 22a, 23a, etc., of FIG. 1 produces a series of individually selected frequencies.

Figure 4:
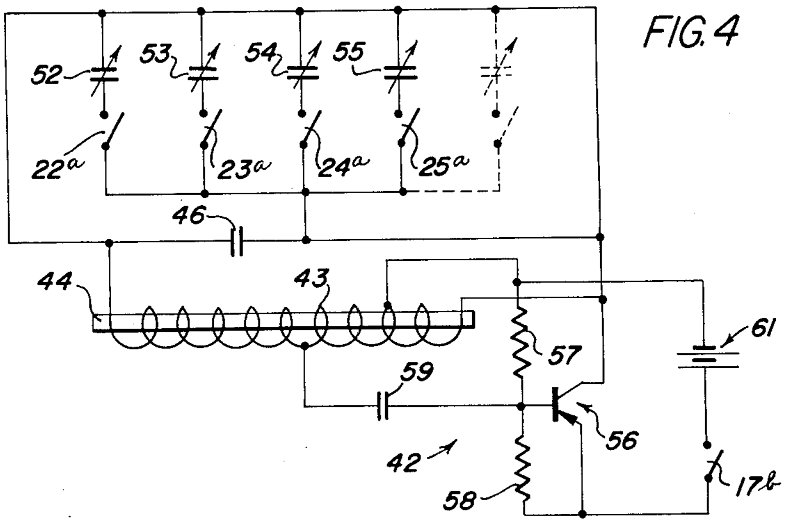
FIG. 4 is a schematic circuit diagram of the inductive field producing circuit.

FIG. 4 shows the same circuit as FIG. 3, except that the components are represented by conventional electrical symbols instead of being physically represented, the same reference characters being used to identify corresponding elements in both figures.

Figures 5, 7:
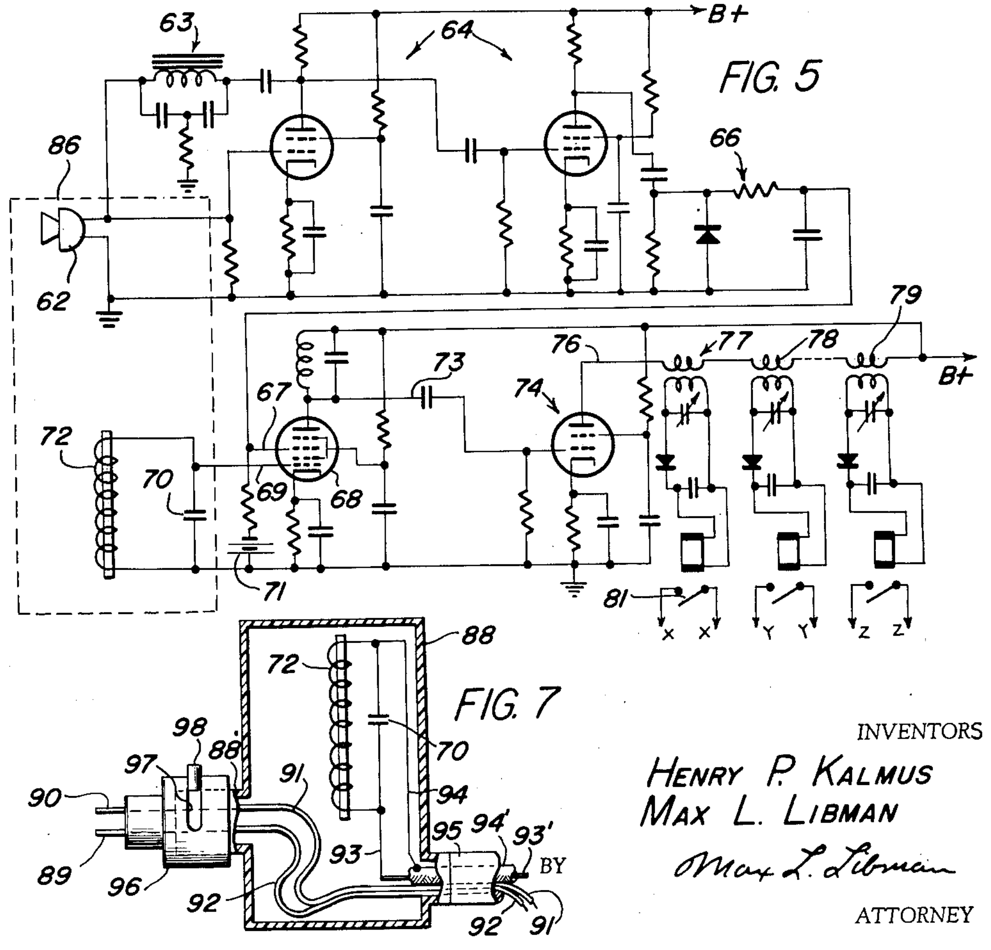
FIG. 5 is a schematic circuit diagram of the receiving circuit for the control device.
FIG. 7 is a view, partly in section, of the combined unit.

FIG. 5 is a circuit diagram of the receiving circuit used in controlling the operation for example, of a television set. Microphone 62 picks up the sound produced by the bell, and responds by the use of a bridged-T-network 63 to substantially the same frequency as is produced by the gong 6 with a specific band width. A conventional two-stage amplifier generally indicated at 64 is employed to raise the signal to a suitable level, and the output is rectified and smoothed at 66 to produce a suitable biasing voltage on grid lead 67 of a pentagrid converter tube 68 used as a coincidence tube. Control grid 69 of tube 68 is supplied with the induction field signal transmitted from coil 44 of the transmitter unit; however, this signal is not passed by tube 68 until the blocking bias of battery 71 has been removed by a sufficient positive potential on grid 67 from rectifier circuit 66. It therefore requires the coincidence of a sound signal picked up by microphone 62 and the inductive field signal picked up by coil 72 from transmitter coil 44 to cause a suitably amplified signal to be transmitted on plate lead 73 of tube 68. This signal is then further amplified by a conventional amplification stage 74 and transmitted to line 76 and thence to a series of tuned circuits 77, 78 . . . 79, which are respectively tuned to frequencies corresponding to those produced by the operation of the respective pushbuttons 22a–25a. Thus for example, operation of switch 22a will cause energization of the relay associated with tuned circuit 77, and thus cause the closing of relay switch 81. This may, for example, control the switch which turns the set on, and thus initiates its operation from the remote location. After this, pressing button 23a may cause the circuit leads Y—Y to be energized, and which would cause the station selector to be advanced by one step, as is now customary. On the other hand, the present circuit permits a separate switch to be provided for each station or channel to be selected, by merely employing a sufficient number of tuned circuits and switches for this purpose. In this way, the channel to be selected can be obtained directly, without the tedious process of stepping through a number of intermediate channels, as is presently the case. Another one of the circuits may be used for volume control purposes, employing means presently known for this purpose. A second operation of the same pushbutton 22a which was used to turn the set on can be employed to turn the set off, it being only necessary to maintain the circuit shown in FIG. 5 energized under stand-by conditions. The power required for such stand-by operation with the circuit shown is very small compared with some of the more elaborate circuits used for other control devices.

Figure 6:
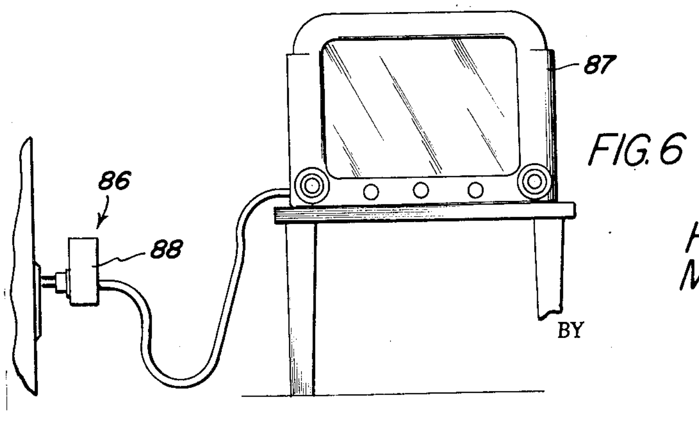
FIG. 6 is an elevation view of a television set with a combined pickup unit and power plug.

FIG. 6 shows the manner in which the signal pickup components of the receiving control unit are mounted with respect to a typical television set 87. The components shown in the dotted rectangle 86 of FIG. 5, namely the ferrite-cored coil 72 and condenser 70, constituting the receiving tank circuit, and, if desired, the microphone 62 are housed in the special plug housing 88 which is made a part of the power supply plug of the television set. The remaining components are housed within the cabinet of the television receiver 87, and a suitable cable is provided for conducting both the 60 cycle alternating current and the leads from the control circuit pickup means enclosed in housing 88, which must, of course, be suitably shielded, as is well known.

It will be noted that a simpler and less expensive remote control system may be achieved, if desired, by omitting the acoustic elements and using only the induction field transmitter, together with the plug housing 88 containing the induction field pickup, as shown in FIG. 7. This is made possible, as previously stated, by the remote location of the pickup unit 72. This solution will be satisfactory in those locations where there is no possibility of induction field interference from other similar transmitters, e.g., in separately located private homes, etc.

Referring to FIG. 7, which exemplifies only one possible construction, the prongs 89 and 90 of a conventional electric power plug are connected respectively to A.-C. power leads 91 and 92. The leads 93 and 94 of the pickup and circuit 70, 72 are connected to the inner conductor 93' and outer braided shield 94' of a thin shielded cable, the entire assembly of conductors being suitably enclosed in a flexible insulating and protective tube 95 to form a unitary power and signal cable leading to the television set. The pickup coil 72 and conductor 70 are enclosed in a housing 88, preferably of plastic, which has a tubular extension 88' extending into tubular casing 96 which has a 90° slot 97 therein in which a pin 98 is confined. Pin 98 is fixed to extension 88' and thus permits the housing 88 to be swiveled through 90° so that it may be set into a vertical position regardless of the orientation of the outlet socket into which the prongs 90 must fit. The leads 91 and 92 are sufficiently flexible, and are permitted enough space within the housing 88 to allow the necessary amount of angular rotation of the housing with respect to the casing 96.

The field produced by the transmitting coil 43, 44, has non-uniform orientation with respect to the axis of the ferrite core 44. To make the device non-directional, it is therefore preferable to mount the core in a vertical position as shown, since then the field strength in the horizontal plane in all directions from the core is uniform. Similarly, the receiving coil 72 should also preferably be mounted in a vertical position, and the user should be advised to this effect. If desired, the housing 88 can be swivel-mounted with respect to the plug, so that it may always be turned up to a vertical position. Alternatively, a universal mounting may be provided between the plug and the coil housing, whereby the coil may be always put into a vertical position no matter what direction the plug prongs are required to assume in order to engage the socket.

With the arrangement shown, the only possibility of unintentional operation of the set would occur if a person in another room nearby were operating a similar control device at the same time that a note of the predetermined acoustic frequency happened to be produced in the room containing the set 87, for example, if the set's loud speaker were producing such a note at this time. By using a sharply tuned acoustic system, this possibility can be minimized to a negligible point; also, if desired, the bell or gong 6 can be tuned to an ultrasonic frequency, to eliminate even this remote possibility. However, this requires more elaborate apparatus at the receiving end, and it is therefore preferred to use a pleasant acoustic note of a sharply tuned signal frequency, in other words, a pure sine wave. At least, the receiving circuit could be thus sharply tuned, since it will be possible to permit some overtones in the gong in order to produce a more pleasing tonal effect, without affecting the efficiency of the system.

It will be apparent that the circuit of FIG. 5 can also be transistorized to still further reduce the standby power. The use of the relatively low frequency range suggested permits inexpensive circuit construction and components to be employed, which is another advantage of the invention.

The word "acoustic" as used in this specification is intended to include both audible sound frequencies and supersonic vibrations imparted to the air.

It will be apparent that the embodiment shown are only exemplary and that various modifications can be made in construction and arrangement within the scope of our invention as defined in the appended claims.

We claim:

1. Remote control apparatus comprising a dual path control signal transmitter including a manually operable actuating device, means for simultaneously producing an acoustic signal and an electrical field signal by manual actuation of said device, and dual control signal responsive means spaced from said transmitter comprising means responsive only to the simultaneous reception of said two signals to operate a control device, said last means including means separately responsive to each of said two signals.

2. The invention according to claim 1, said means for producing an electric field signal comprising means for producing an induction field.

3. The invention according to claim 2, said acoustic signal being of a predetermined acoustic frequency, and said signal responsive means comprising means tuned to said frequency.

4. The invention according to claim 3, said last means including acoustic transducer means for converting said acoustic signal to an electric signal at a frequency corresponding to the acoustic signal frequency, said tuned means comprising electric circuit means tuned to said frequency.

5. The invention according to claim 2, said acoustic signal being of a predetermined frequency, said transmitter means comprising a plurality of separate tuned circuits manually selectively operable for controlling the frequency of said induction field, and means for producing said acoustic frequency signal upon actuation of any selected one of said tuned circuits.

6. The invention according to claim 5, said separate tuned circuits being tuned to a stepped series of frequencies in the region of 40 kilocycles.

7. A dual control signal transmitter comprising a small, hand-held, self-contained housing, an induction-field transmitting coil within said housing, said coil having a magnetic core, a mechanical acoustic tone producer in said housing, and means within said housing for simultaneously actuating both said coil and said tone producer to simultaneously emit both an acoustic signal and an induction field signal.

8. The invention according to claim 7, said acoustic tone producer being a gong and a clapper for striking same.

9. The invention according to claim 8, the means for actuating the coil comprising an electric battery, an electronic oscillator supplied by said battery, said coil being part of the tank circuit of said oscillator, a plurality of condenser units, and selector switch means for selectively switching said condenser units into the tank circuit to selectively control the frequency of the induction field transmitted by said coil.

10. The invention according to claim 9, said selector switch means comprising a plurality of separate individual switch means, each having a manually operable button external to the housing, each said individual switch means comprising means for substantially simultaneously closing the circuit to said battery and to a sub-circuit connecting the associated condenser unit into the tank circuit, and means for operating the clapper to strike the gong whenever any of the individual switch means is operated.

11. For use with a remote control induction field generator, a television set having a cabinet and a length of flexible power cord extending from said cabinet and terminating in a power plug for attachment to a conventional power outlet, by means of which power is provided to operate the television set; and an induction field receiver at said set; said induction field receiver including a pick-up coil unit located in the immediate proximity of said power plug and supported thereby, induction field receiver circuit components located at said cabinet, control means for said television set actuated selectively by said receiving unit in accordance with signals transmitted from said induction field generator, and flexible conductive leads extending from said pick-up coils unit to said induction field receiver circuit components, said pick-up coil being sufficiently remote from the television set to be substantially unaffected by any induction field originating within the set, said conductive leads comprising a shielded cable physically coextensive with said power cord to form a single length of combined power and pickup cord, and a housing for said pick-up coil unit physically attached to said power plug to provide an integral plug-pick-up unit, said housing having a limited amount of rotary freedom with respect to said plug so that it may be given a desired angular orientation with respect to the plug.

12. The invention according to claim 11, said pick-up coil unit comprising a pick-up coil having a ferrite core and a condenser parallel therewith.

References Cited in the file of this patent

UNITED STATES PATENTS

| | | |
|---|---|---|
| 2,186,578 | Doughman | Jun. 9, 1940 |
| 2,509,345 | Howell et al. | May 30, 1950 |
| 2,817,025 | Adler | Dec. 17, 1957 |
| 2,840,700 | Browder | June 24, 1958 |
| 2,855,993 | Rahmel | Oct. 14, 1958 |
| 2,897,354 | Bourget et al. | July 28, 1959 |
| 2,930,955 | Bourget et al. | Mar. 29, 1960 |
| 2,943,146 | Thomas | June 28, 1960 |

OTHER REFERENCES

W. H. Buchshaun: "TV Remote Controls for the Technician," Radio & TV News, November 1957, pages 58–61.

Notice of Adverse Decision in Interference

In Interference No. 93,319 involving Patent No. 3,042,868, H. P. Kalmus and M. L. Libman, Dual path remote control system, final decision adverse to the patentees was rendered July 9, 1963, as to claim 1.

[*Official Gazette September 3, 1963.*]

Disclaimer 3,042,868.—*Henry P. Kalmus*, Washington, D.C., and *Max L. Libman*, Fairfax County, Va. DUAL PATH REMOTE CONTROL SYSTEM. Patent dated July 3, 1962. Disclaimer filed Sept. 3, 1963, by the inventors.

Hereby enter this disclaimer to claim 1 of said patent.

[*Official Gazette October 29, 1963.*]